United States Patent
Bouilloux et al.

(10) Patent No.: US 6,759,480 B1
(45) Date of Patent: Jul. 6, 2004

(54) THERMOPLASTIC RESINS MODIFIED BY COPOLYMERS BASED ON HEAVY ACRYLATES

(75) Inventors: Alain Bouilloux, Bernay (FR); Christophe Lacroix, Harquency (FR); Jean-Marc Le Blevec, Billiere (FR); Thibaut Montanari, Bernay (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/670,121

(22) Filed: Sep. 26, 2000

(51) Int. Cl.$^7$ .............. C08L 29/04; C08L 61/00; C08L 67/00; C08L 69/00; C08L 75/04

(52) U.S. Cl. .............. 525/60; 525/57; 525/58; 525/64; 525/66; 525/69; 525/71; 525/72; 525/73; 525/74; 525/76; 525/78; 525/79; 525/80; 525/92 A; 525/125; 525/131; 525/155; 525/166; 525/175; 525/176; 525/191; 525/199; 525/227

(58) Field of Search .............. 525/57, 58, 60, 525/64, 66, 67, 69, 71, 72, 73, 74, 76, 78, 79, 80, 92 A, 125, 131, 155, 166, 175, 176, 191, 199, 227, 183

(56) References Cited

U.S. PATENT DOCUMENTS

| | | |
|---|---|---|
| 3,694,412 A | 9/1972 | Nozaki |
| 4,115,475 A | 9/1978 | Foy et al. ............. 525/425 |
| 4,174,358 A | 11/1979 | Epstein et al. ............. 525/183 |
| 4,195,015 A | 3/1980 | Deleens et al. ............. 524/255 |
| 4,230,838 A | 10/1980 | Foy et al. ............. 525/408 |
| 4,331,786 A | 5/1982 | Foy et al. ............. 525/408 |
| 4,332,920 A | 6/1982 | Foy et al. ............. 525/408 |
| 4,554,320 A | 11/1985 | Reimann et al. ............. 525/183 |
| 4,839,441 A | 6/1989 | Cuzin et al. ............. 528/328 |
| 4,843,144 A | 6/1989 | Van Broekhoven et al. 528/392 |
| 4,864,014 A | 9/1989 | Cuzin et al. ............. 528/279 |
| 4,880,903 A | 11/1989 | Van Broekhoven et al. 528/392 |
| 4,977,216 A | * 12/1990 | Elia ............. 525/183 |
| 5,070,145 A | 12/1991 | Guerdoux ............. 525/179 |
| 5,747,605 A | 5/1998 | Breant et al. ............. 525/437 |
| 6,576,309 B2 | * 6/2003 | Dalgewicz, III et al. ... 428/36.8 |

FOREIGN PATENT DOCUMENTS

| | | |
|---|---|---|
| EP | 0 081 969 | 6/1983 |
| EP | 0 096 264 | 12/1983 |
| EP | 0 298 282 | 1/1989 |
| EP | 0 330 015 | 8/1989 |
| EP | 342066 | 11/1989 |
| EP | 402883 | 12/1990 |
| EP | 405227 | 1/1991 |
| EP | 0 711 791 | 5/1996 |

* cited by examiner

*Primary Examiner*—Ana Woodward
(74) *Attorney, Agent, or Firm*—Smith, Gambrell & Russell, LLP

(57) ABSTRACT

The invention relates to thermoplastic compositions comprising:
- 40 to 97 parts of a thermoplastic polymer (M) forming a matrix, chosen from polyamides, polyamide block copolymers, fluoro polymers, polycarbonate, styrene resins, PMMA, thermoplastic polyurethanes (TPU), copolymers containing polyester blocks and polyether blocks, polycarbonate-polyester alloys, polyketones, PVC and ethylene-vinyl alcohol copolymers (EVOH),
- 60 to 3 parts of (B) comprising:
  either an ethylene-alkyl (meth)acrylate copolymer (B1), the alkyl having at least 5 carbon atoms, which copolymer (B1) carries a functional group
  or a blend of an ethylene-alkyl (meth)acrylate copolymer (B2), the alkyl having at least 5 carbon atoms, which copolymer (B2) does not carry a functional group, and of an impact modifier which carries a functional group.

9 Claims, No Drawings

THERMOPLASTIC RESINS MODIFIED BY COPOLYMERS BASED ON HEAVY ACRYLATES

FIELD OF THE INVENTIONS

The present invention relates to thermoplastic resins modified by copolymers based on heavy acrylates, such as, for example, ethylene/2-ethylhexyl acrylate/maleic anhydride copolymers or ethylene/2-ethylhexyl acrylate copolymers blended with functionalized impact modifiers. The thermoplastic resins are, for example, polyamides, PMMA, polycarbonate or ABS. These modified resins are used to manufacture articles having an improved impact strength. These resins are manufactured by melt blending the various constituents in extruders, mixers (for example, a BUSS® Ko-Kneader) or any other device for blending thermoplastics.

BACKGROUND OF THE INVENTION

EP 096,264 discloses polyamides having a viscosity of between 2.5 and 5, these being reinforced by ethylene/$C_2$ to $C_8$ alkyl (meth)acrylate/unsaturated acid or anhydride copolymers comprising 20 to 40% by weight of acrylate. The heaviest acrylate used in the examples is n-butyl acrylate.

U.S. Pat. No. 5,070,145 discloses polyamides reinforced by a blend of (i) a polyethylene or an ethylene/alkyl (meth)acrylate copolymer and of (ii) an ethylenelalkyl (meth)acrylate/maleic anhydride copolymer. As in the previous prior art, the heaviest acrylate used in the examples is n-butyl acrylate.

U.S. Pat. No. 4,174,358 discloses reinforced polyamides in the form of a polyamide matrix in which nodules smaller than 1 μm are dispersed, these nodules having a certain modulus which also has to be a fraction of the modulus of the polyamide. Very many reinforcing agents are described, some of them having epoxy functional groups. Most are polymers having neutralized acid or anhydride functional groups or are EPDM-based blends. In column 13, polymer 26 is an ethylene/2-ethylhexyl methacrylate/carbon monoxide copolymer, which is used to modify nylon-6,6.

It has now been discovered that if thermoplastic resins are modified by copolymers or blends of copolymers comprising both heavy acrylates and at least one functional group, then impact strengths are obtained which are markedly improved over the prior art. The functional group may be, for example, an anhydride, an acid, an epoxy or an amine.

SUMMARY OF THE INVENTION

The present invention relates to thermoplastic compositions comprising:
- 40 to 97 parts of a thermoplastic polymer (M) forming a matrix, chosen from polyamides, polyamide block copolymers, fluoro polymers, polycarbonate, styrene resins, PMMA, thermoplastic polyurethanes (TPU), copolymers containing polyester blocks and polyether blocks, polycarbonate-polyester alloys, polyketones, PVC and ethylene-vinyl alcohol copolymers (EVOH),
- 60 to 3 parts of (B) comprising:
  either an ethylene-alkyl (meth)acrylate copolymer (B1), the alkyl having at least 5 carbon atoms, which copolymer (B1) carries a functional group
  or a blend of an ethylene-alkyl (meth)acrylate copolymer (B2), the alkyl having at least 5 carbon atoms, which copolymer (B2) does not carry a functional group, and of an impact modifier which carries a functional group.

DETAILED DESCRIPTION OF THE INVENTION

The polymers (M) are firstly described; regarding the polyamides, a polyamide should be understood to mean the product of the condensation:
- of one or more amino acids, such as aminocaproic, 7-aminoheptanoic, 11-aminoundecanoic and 12-aminododecanoic acids or of one or more lactams, such as caprolactam, oenantholactam and lauryllactam;
- of one or more salts or mixtures of diamines, such as hexamylylenediamine, dodecamethylenediamine, metaxylylenediamine, bis-p(aminocyclohexyl)methane and trimethylhexamethylenediamine with diacids such as isophthalic, terephthalic, adipic, azelaic, suberic, sebacic and dodecane dicarboxylic acids;
- or of mixtures of some of these monomers, thereby resulting in copolyamides, for example PA-6/12 by the condensation of caprolactam with lauryllactam.

Polymers having polyamide blocks and polyether blocks result from the copolycondensation of polyamide blocks having reactive end groups with polyether blocks having reactive end groups, such as, inter alia:
1) polyamide blocks having diamine chain ends with polyoxyalkylene blocks having dicarboxylic chain ends;
2) polyamide blocks having dicarboxylic chain ends with polyoxyalkylene blocks having diamine chain ends obtained by cyanoethylation and hydrogenation of aliphatic dihydroxylated alpha,omega-polyoxyalkylene blocks called polyetherdiols;
3) polyamide blocks having dicarboxylic chain ends with polyetherdiols, the products obtained being, in this particular case, polyetheresteramides.

The polyamide blocks having dicarboxylic chain ends come, for example, from the condensation of alpha,omega-aminocarboxylic acids, of lactams, or of dicarboxylic acids with diamines in the presence of a chain-stopper dicarboxylic acid. Advantageously, the polyamide blocks are nylon-12 or nylon-6 blocks.

The number-average molar mass of the polyamide blocks is between 300 and 15,000 and preferably between 600 and 5000. The mass of the polyether blocks is between 100 and 6000 and preferably between 200 and 3000.

The polymers having polyamide blocks and polyether blocks may also include randomly distributed units. These polymers may be prepared by the simultaneous reaction of the polyether and of the polyamiide-block precursors.

For example, polyetherdiol, a lactam (or an alpha,omega-amino acid) and a chain-stopper diacid may be reacted in the presence of a little water. A polymer is obtained which has essentially polyether blocks and polyamide blocks of very variable length, but also the various reactants which, having reacted randomly, are distributed randomly along the polymer chain.

These polymers having polyamide blocks and polyether blocks, whether they come from the copolycondensation of polyamide and polyether blocks prepared beforehand or from a one-step reaction, have, for example, Shore D hardnesses which may be between 20 and 75, and advantageously between 30 and 70, and an intrinsic viscosity, measured in metacresol at 25° C., of between 0.8 and 2.5.

Whether the polyether blocks derive from polyethylene glycol, polyoxypropylene glycol or polyoxytetramethylene glycol, they are either used as they are and copolycondensed with polyamide blocks having carboxylic ends, or they are aminated in order to be converted into polyether diamines and condensed with polyamide blocks having carboxylic ends. They may also be blended with polyamide precursors and a chain stopper in order to make polymers containing polyamide blocks and polyether blocks and having randomly distributed units.

Polymers having polyamide blocks and polyether, blocks are disclosed in Patents U.S. Pat. No. 4,331,786, U.S. Pat. No. 4,115,475, U.S. Pat. No. 4,195,015, U.S. Pat. No. 4,839,441, U.S. Pat. No. 4,864,014, U.S. Pat. No. 4,230,838 and U.S. Pat. No. 4,332,920.

The polyether may be, for example, a polyethylene glycol (PEG), a polypropylene glycol (PPG) or a polytetramethylene glycol (PTMG). The latter is also called polytetrahydrofuran (PTHF).

Whether the polyether blocks are introduced into the chain of the polymer containing polyamide blocks and polyether blocks in the form of diols or diamines, they are called, for simplification, PEG blocks or PPG blocks or PTMG blocks.

It would not be outside the scope of the invention if the polyether blocks were to contain units different from units derived from ethylene glycol, propylene glycol or tetramethylene glycol.

Advantageously, the polymer containing polyamide blocks and polyether blocks is such that the polyamide is the predominant constituent by weight, that is to say the amount of polyamide which is in block form and that which is possibly distributed randomly in the chain represents 50% by weight or more of the polymer containing polyamide blocks and polyether blocks. Advantageously, the amount of polyamide and the amount of polyether are in the ratio (polyamide/polyether) of 50/50 to 80/20.

Preferably, the polyamide blocks and the polyether blocks of the same polymer (B) have $\overline{M}_n$ masses of 1000/1000, 1300/650, 2000/1000, 2600/650 and 4000/1000, respectively.

By way of examples of fluoro polymers, mention may be made of polyvinylidene fluoride (PVDF), copolymers comprising vinylidene fluoride (VF2), ethylene-tetrafluoroethylene copolymers, poly(trifluoroethylene), trifluoroethylene copolymers, hexafluoropropylene homopolymers and copolymers, and chlorotrifluoroethylene homopolymers and copolymers. Advantageously, PVDF is used.

By way of examples of styrene polymers, mention may be made of polystyrene, SAN (styrene/acrylonitrile copolymer), ABS, SAN/ABS alloys and polycarbonate/ABS alloys.

As thermoplastic polyurethanes, mention may be made of polyether urethanes, for example those comprising diisocyanate units, units derived from polyetherdiols and units derived from ethanediol or from 1,4-butanediol. Mention may also be made of polyester urethanes, for example those comprising diisocyanate units, units derived from morphous polyester diols and units derived from ethanediol or from 1,4-butanediol.

The copolymers containing polyester blocks and polyether blocks are copolymers having polyether units derived from polyetherdiols such as polyethylene glycol (PEG), polypropylene glycol (PPG) or polytetramethylene glycol (PTMG), dicarboxylic acid units 11 such as terephthalic acid and glycol units (ethanediol or 1,4-butanediol). The chain linking of the polyethers and diacids forms the soft segments of the copolyetherester while the chain linking of the glycol or butanediol with the diacids forms the hard segments of the copolyetherester. Such copolyetheresters are disclosed in Patents EP 402,883 and EP 405,227, the contents of which are incorporated in the present application.

By way of examples of polyesters in the polycarbonate/polyester alloys, mention may be made of PET (polyethylene terephthalate), PBT (polybutylene terephthalate) and PEN (polyethylene naphthenate).

The polyketones are polymers comprising substantial(y one mole of carbon monoxide for each mole of unsaturated monomer. This monomer may be chosen from alpha-olefins having from 2 to 12 carbon atoms or their substitution derivatives. It may also be chosen from styrene or its derivatives obtained by substitution with alkyls such as methyl styrenes, ethyl styrene and isopropyl styrene. Preferably, the polyketones are ethylene-carbon monoxide copolymers or ethylene-propylene-carbon monoxide copolymers.

When the polyketones are copolymers of ethylene, a second monomer and carbon monoxide, there are at least two ethylene units for one unit of the second monomer, and preferably 10 to 100.

The polyketones may be represented by the formula:

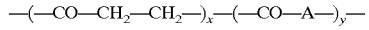

in which A denotes an unsaturated monomer having at least 3 carbon atoms, the x/y ratio being at least 2.

The —(—CO—CH$_2$—CH$_2$—) and —(—CO—A—)— units are distributed randomly within the polyketone chain.

The number-average molar masses (measured by gel permeation chromatography) may be between 1000 and 200,000, advantageously between 20,000 and 90,000. The melting points may be between 175 and 300° C., usually between 200 and 270° C. Syntheses of these polyketones are described in U.S. Pat. Nos. 4,843,144, 4,880,903 and U.S. Pat. No. 3,694,412, the contents of which are incorporated in the present application.

It would not be outside the scope of the present invention to use a blend of several thermoplastics as (M).

With regard to (B1), the functional group may be attached by grafting a functional monomer or by copolymerization with this monomer.

By way of examples of functional groups, mention may be made of carboxylic acids and their derivatives, acid chlorides, isocyanates, oxazolines, epoxides, amines and hydroxides.

Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of unsaturated carboxylicl acids.

Unsaturated dicarboxylic acids having 4 to 10 carbon atoms and their functional derivatives, particularly their anhydrides, are particularly preferred monomers.

These monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]-hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides.

Examples of other monomers comprise amide derivatives of unsaturated carboxylic acids, such as acrylamide, methacrylamide, the monoamide of maleic acid, the diamide of maleic acid, the N-monoethylamide of maleic acid, the N,N-diethylamide of maleic acid, the N-monobutylamide of maleic acid, the N,N-dibutylamide of maleic acid, he monoamide of fumaric acid, the diamide of fumaric acid, the N-monoethylamide of fumaric acid, the N,N-diethylamide of fumaric acid, the N-monobutylamide of fumaric acid and the N,N-dibutylamide of fumaric acid; imide derivatives of unsaturated carboxylic acids, such as maleimide, N-butylmaleimide and N-phenylmaleimide; and metal salts of unsaturated carboxylic acids such as sodium acrylate, sodium methacrylate, potassium acrylate and potassium methacrylate.

Examples of unsaturated epoxides are especially:

aliphatic glycidyl esters and ethers, such as allyl glycidyl ether, vinyl glycidyl ether, glycidyl maleate, glycidyl itaconate, glycidyl acrylate and glycidyl methacrylate, and alicyclic glycidyl esters and ethers, such as 2-cyclohexen-1-yl glycidyl ether, diglycidyl cyclohexene-4,5-dicarboxylate, glycidyl cyclohexene-4-carboxylate, glycidyl 2-methyl-5-norbornene-2-carboxylate and diglycidyl endo-cis-bicyclo[2.2.1]hept-5-ene-2,3-dicarboxylate.

Advantageously, the alkyl of the (meth)acrylate has from 5 to 20 carbon atoms. By way of examples, mention may be made of 2-ethylhexyl acrylate (2EHA), n-octyl acrylate and isononyl acrylate. The proportion of (meth)acrylate is advantageously from 5 to 40% by weight of (B1) and the proportion of the functional group is advantageously from 0.1 to 10% by weight of (B1). The MFI of (B1) is advantageously between 0.2 and 40 (at 190° C./2.16 kg). The MFI (the abbreviation for Melt Flow Index) is expressed in g/10 min. Preferably, the functional group is attached by copolymerization of ethylene with (meth)acrylate. These copolymers may be manufactured by radical polymerization in tube reactors or autoclaves at pressures of between 200 and 3000 bar.

With regard to the variant in which (B) comprises (B2) and an impact modifier, (B2) is an ethylene-alkyl (meth) acrylate copolymer, the alkyl having at least 5 carbon atoms. (B2) differs from (B1) only by the absence of a functional group. The MFI of (B2) is advantageously between 0.2 and 40 (190° C./12.16 kg).

The functional group of the impact modifier may be chosen from the same functional groups as those of (B1).

The impact modifier may be a polyolefin chain having polyamide grafts or polyamide oligomers; thus, it exhibits affinity with polyolefins and polyamides.

The impact modifier may also be an ethylene copolymer having maleic anhydride units; thus, it exhibits affinity with polyethylenes and can react with polyamides.

By way of examples of impact modifiers, mention may be made of functionalized polyolefins, grafted aliphatic polyesters, polymers containing polyether blocks and polyamide blocks, optionally grafted, and copolymers of ethylene and a vinyl ester of a saturated carboxylic acid. The copolymers containing polyether blocks and polyamide blocks may be chosen from those mentioned above. They can be used as the, polymers (M) and also as a flexibilizer. In the latter case, flexible copolymers, that is to say those having a flexural modulus between 10 and 200 MPa, are chosen instead.

The impact modifier may also be a block copolymer having at least one block compatible with (M) and at least one block compatible with (B2).

The functionalized polyolefin is a polymer comprising alpha-olefin units and epoxy or carboxylic acid or carboxlic acid anhydride units.

By way of examples of impact modifiers, mention may be made of polyolefins or SBS, SIS and SEBS block copolymers, EPR (also called EPM) or EPDM, these being grafted by unsaturated epoxides, such as glycidyl (meth) acrylate, or by carboxylic acids, such as (meth acrylic acid or else by anhydrides of unsaturated carboxylic acids, such as maleic anhydride. EPR denotes ethylene-propylene elastomers and EPDM denotes ethylene-propylene-diene elastomers.

Polyolefin is understood to mean a polymer comprising olefin units such as, for example, ethylene, propylene, 1-butene, or any other alpha-olefin, units. By way of examples, mention may be made of:

polyethylenes such as LDPE, HDPE, LLDPE or VLDPE, polypropylene, ethylene/propylene copolymers or metallocene PEs;

copolymers of ethylene with at least one product chosen from the salts or esters of unsaturated carboxylic acids, or the vinyl esters of saturated carboxylic acids.

Advantageously, the polyolefin is chosen from LLDPE, VLDPE, polypropylene, ethylene/vinyl acetate copolymers or ethylene/alkyl (meth)acrylate copolymers. The relative density may be advantageously between 0.86 and 0.965 and the melt flow index (MFI) may be between 0.3 and 40.

By way of examples of impact modifiers, mention may also be made of:

copolymers of ethylene, an unsaturated epoxide and, optionally, an ester or a salt of an unsaturated carboxylic acid or a vinyl ester of a saturated carboxylic acid. These are, for example, ethylene/vinyl acetate/glycidyl (meth)acrylate copolymers or ethyene/alkyl (meth) acrylate/glycidyl (meth)acrylate copolymers;

copolymers of ethylene, an unsaturated carboxylic acid anhydride and/or a saturated carboxylic acid that may be partially neutralized by a metal (Zn) or an alkali metal (Li) and possibly an ester of an unsaturated carboxylic acid or a vinyl ester of a saturated carboxylic acid. These are, for example, ethylene/vinyl acetate/ maleic anhydride copolymers or ethylenelalkyl (meth) acrylate/maleic anhydride copolymers or ethylene/Zn or Li (meth)acrylate/maleic anhydride copolymers;

polyethylene, polypropylene, ethylene-propylene copolymers grafted or copolymerized with an unsaturated carboxylic acid anhydride and then condensed with a monoaminated polyamide (or a polyamide oligomer). These products are described in EP 342,066.

Advantageously, the functionalized polyolefin is chosen from ethylenelalkyl (meth)acrylate/maleic anhydride copolymers, ethylene/vinyl acetate/maleic anhydride copolymers and ethylene-propylene copolymers containing predominantly propylene, these being grafted, by maleic anhydride and then condensed with monoaminated nylon-6 or monoaminated oligomers of caprolactam.

Preferably, it is an ethylene/alkyl (meth)acrylate/maleic anhydride copolymer comprising up to 40% by weight of alkyl (meth)acrylate and up to 10% by weight of maleic anhydride. The alkyl (meth)acrylate may be chosen from methyl acrylate, ethyl acrylate, n-butyl acrylate, isobutyl acrylate, 2-ethylhexyl acrylate, cyclohexyl acrylate, methyl methacrylate and ethyl methacrylate.

As grafted aliphatic polyesters, mention may be made of polycaprolactone grafted by maleic anhydride, glycidyl methacrylate, vinyl esters or styrene. These products are described in Application EP 711,791, the contents of which are incorporated in the present application.

Advantageously, the impact modifier is chosen from ethylene-propylene copolymers (EPR and EPDM) grafted by maleic anhydride, ethylene-alkyl (meth)acrylate-maleic anhydride copolymers, the latter copolymers possibly being blended with ethylene-alkyl (meth)acrylate copolymers, ethylene-alkyl (meth)acrylate/maleic anhydride copolymers blended with (i) ethylene-alkyl (meth)acrylate-glycidyl methacrylate copolymers and (ii) ethylene-alkyl (meth) acrylate-acrylic acid copolymers, the latter three copolymers being crosslinked. These ethylene-alkyl (meth)acrylate-maleic anhydride, ethylene-alkyl (meth)acrylate-glycidyl methacrylate and ethylene-alkyl (meth)acrylate-acrylic acid copolymers may contain up to 40% by weight of acrylate and 10% by weight either of anhydride or of epoxide or of acid. The MFI (melt flow index, is between 2 and 50 g/10 min, measured at 190° C./2.16 kg.

Advantageously, the impact modifier has a flexural modulus of less than 200 MPa and preferably between 10 and 200 MPa.

The proportions of (B2) and of the impact modifier may vary over a wide range and advantageously are in the 80/20 to 20/80 ratio.

The impact strength increases with the amount of (B), the proportion of (B) being advantageously from 5 to 35 parts per 95 to 65 parts of (M) and preferably 15 to 25 parts per 85 to 75 parts of (M).

It would not be outside the scope of the invention to use several copolymers (B1) having identical or different functional groups and, likewise, several copolymers (B2) having identical or different functional groups and associated with one or more impact modifiers may be used.

It would not be outside the scope of the invention to add other polymers to (B), such as functionalized or non-functionalized olefin homopolymers or copolymers. By way of examples, mention may be made of ethylene/alkyl (meth) acrylate copolymers whatever the type of alkyl, but alkyl (meth)acrylates having at least 5 carbon atoms, like those described in the present invention, are preferred.

According to a second embodiment of the invention, (B) also comprises a functionalized polymer (C1) or a difunctional reactive agent (C2) so as to form a crosslinked dispersed phase in the matrix (M). The benefit of this crosslinked dispersed phase is that it facilitates its incorporation into the matrix (M) in high amounts, such as 40 to 60%, without the risk of matrix inversion. The advantage of this crosslinked phase, whatever its amount, is that it enables the flexural modulus of the compositions of the invention to be increased. In order to carry out this crosslinking, reactions between carboxylic acid anhydride functional groups and epoxy functional groups are preferred.

With regard to (B) of the (B1) type, (C1) may advantageously be chosen from the impact modifiers already mentioned above, provided that it has functional groups that can react with those of (B1), or from copolymers (B1) provided that it has functional groups that can react with those of (B1) already present. In the latter case, the phase. (B) is the product of the reaction of two copolymers (B1) which have different functional groups and can react with each other. Advantageously, (C2) is a dicarboxylic acid, such as adipic acid or dodecanedioic acid, or a diepoxy, such as DGEBA (diglycidyl ether of bisphenol A).

With regard to (B) of the (B2) type as a blend with the impact modifier, (C1) may be chosen from another impact modifier, provided that it has functional groups that can react with those of the impact modifier already present, or from copolymers (B1), provided that it has functional groups that can react with those of the impact modifier. (C2) is as mentioned above.

These crosslinking reactions usually take place according to the stoichiometry of the functional groups in question, and those skilled in the art may therefore readily determine the proportions of (B1), (B2), (C1) or (C2). Advantageously, the reaction between the anhydride functional group and the epoxy functional group is used to form the crosslinked phase.

With regard to the reaction between anhydride and epoxy functional groups, a catalyst may be added. Among compounds capable of accelerating the reaction between the epoxy functional group and the anhydride functional group, mention may be especially made of:

tertiary amines, such as dimethyllaurylamine, dimethylstearylamine, N-butylmorpholine, N,N-dimethylcyclohexylamine, benzyldimethylamine, pyridine, dimethylamino-4-pyridine, methyl-1-imidazole, tetramethylethylhydrazine, N,N-dimethylpiperazine, N,N,N',N'-tetramethyl-1,6-hexanediamine, and a mixture of tertiary amines having from 16 to 18 carbon atoms and known by the name tallow dimethylamine;

tertiary phosphines, such as triphenylphosphine;

zinc alkyldithiocarbamates.

In this second embodiment of the invention, the reaction between the anhydride and epoxy functional groups is advantageously catalysed by acid functional groups. The Applicant has discovered that some of one (or of several) of the polymers carrying anhydride functional groups need only be replaced with a polymer carrying carboxylic acid functional groups. By way of example, 10 to 70% by weight of an ethylene-alkyl (meth)acrylate-maleic anhydride copolymer containing 3% anhydride may be replaced with the same weight of an ethylene-alkyl (meth)acrylate-(meth) acrylic acid copolymer containing 6% acid. Preferably, this proportion is from 20 to 35%.

According to a third embodiment, the present invention relates to thermoplastic compositions comprising:

40 to 97 parts of (M), 60 to 3 parts of a dispersed phase comprising:

0 to 30 parts of a thermoplastic polymer (D) that differs from (M) and is not very compatible with (M) and 3 to 30 parts of (B), (D) being completely or partly encapsulated in (B).

The thermoplastic (D) may be chosen from the family described in the case of (M) but, in addition, also from polyesters such as PET, PBT or PEN. (D) is different, that is to say it is not identical in nature and MFI to (M). For example, if (M) is a PA-6, (D) may be a PA-12. This is because if (D) and (M) are both, for example, PA-12 of the same MFI, the invention is of no benefit. The advantage of this third embodiment of the invention is that it enables nodules of the core-shell type to be incorporated into the matrix (M).

(M) and (D) are chosen so that there is little compatibilty between them. Since (D) is dispersed in the matrix of (M) in the form of nodules, (M) and (D) are deemed to be even more incompatible the coarser the nodules of (D). However, it is estimated that if the nodules of (D) are greater than 10 $\mu$m there is little compatibility, if the nodules are between 0.5 and 10 $\mu$m and preferably between 0.5 and 2 $\mu$m there is compatibility, and below 0.5 $\mu$m there is very great compatibility.

By way of examples of (M)/(D) pairs, mention may be made of:

PA-6/PA-12

PA-12/PA-11

PA-11/PA-12

PA-6/PET

PA-12/PA-12 of different MFI

PA-6/PA-6 of different MFI.

The compositions according to the invention may furthermore contain at least one additive chosen from:

dyes;

pigments;

brighteners;

antioxidants;

UV stabilizers.

The compositions of the invention are manufactured by melt blending the various constituents (twin-screw extruders, single-screw BUSS®, Ko-Kneader) using the standard techniques for thermoplastics. The compositions may be granulated for the purpose of using them subsequently (they need only be remelted) or else subsequently injected into a mould or an extrusion or coextrusion device for manufacturing pipes, profiles or various articles.

The following products were used:

Ultramid® B3 PA-6: a nylon-6 of 20 MFI (235° C./2.16 kg) supplied by BASF;

Terpol 1: an ethyleneethyl acrylate/maleic anhydride terpolymer, of 69.15%/29.5%/1.35% by weight composition respectively, of 6 MFI (190° C./2.16 kg);

Terpol 3: an ethylene/2-ethylhexyl acrylate/maleic anhydride terpolymer, of 69%/30%/1% by weight composition respectively, of 5.5 MFI (190° C./2.16 kg);

Terpol 4: an ethylene/2-ethylhexyl acrylate/maleic anhydride terpolymer of 67%/32%/1% by weight composition respectively, of 6 MFI (190° C./2.16 kg);

Terpol 5: an ethylene/ethyl acrylate/maleic anhydride terpolymer, of 80%/17%/3% by weight composition respectively, of 70 MFI (190° C./2.16 kg);

Copol 1: an ethylene/2-ethylhexyl acrylate copolymer, of 70%/30% by weight composition respectively, of 2 MFI (190° C./2.16 kg);

Copol 2: an ethylene/butyl acrylate copolymer, of 70%/30% by weight composition respectively, of 2 MFI (190° C./2.16 kg).

EXAMPLES

In Examples 1 to 3 and 6–7, a 46 mm BUSS® Ko-Kneader is used as a compounding extruder, followed by a rework extruder. The polyamide and terpolymer granules are introduced via feeders into the well 1 of the kneader.

In Examples 4 to 5, a 40 mm corotating twin-screw (Werner 40) extruder is used as the compounding extruder. The polyamide and terpolymer granules are introduced into the well 1 of the extruder via feeders.

The base nylons is Ultramid B3 from BASF. Two 2EHA terpolymers (Terpol 3 and Terpol 4) are compared here with an ethyl acrylate terpolymer (Terpol 1). After compounding and granulation, the granules are vacuum-dried at 80° C. overnight so as to bring the moisture content measured on the granules down to less than 0.1%. Test pieces in the form of 80×10×4 mm bars are then injection moulded in order to carry out notched Charpy impact tests (according to the ISO 179/1eA:1994 standard) and to measure the flexural modulus (according to the ISO 178:93 standard). These tests are carried out after a conditioning period of 15 days at 23° C. and 50% relative humidity.

It should be noted that the three terpolymers make it possible to achieve impact properties that are markedly superior to that of the nylon-6 alone. Nevertheless, the performance of both 2EHA terpolymers (Terpol 3 and Terpol 4) is much higher than the EA (ethyl acrylate) terpolymer (Terpol 1).

TABLE 1

| Example No. | 1 | 2 | 3 | 4 | 5 | 6 | 7 |
|---|---|---|---|---|---|---|---|
| PA6 (Ultramid B3) | 100 | 80 | 80 | 80 | 80 | 80 | 80 |
| Terpol 1 | | 20 | | 20 | | | |
| Terpol 3 | | | 20 | | | | |
| Terpol 4 | | | | | 20 | | |
| Copol 2 | | | | | | 18 | 18 |
| Copol 1 | | | | | | | |
| Terpol 5 (17% EA/3% MAH) | | | | | | 2 | 2 |
| Extruder | Buss | Buss | Buss | Twin-screw | Twin-screw | Buss | Buss |
| Notched Charpy impact strength (ISO 179:94) at +23° C. | 11 | 40 | 112 | 34 | 43 | 50 | 60 |
| Notched Charpy impact strength (ISO 179:94) at −40° C. | 2.5 | 11 | 16.5 | 11 | 17 | 12 | 14.5 |

These are measurements made on test pieces conditioned for 15 days at 50% RH
46 mm Buss compounding conditions: T* = 230–270° C.; speed = 285 rpm, throughput = 20 kg/h
40 mm twin-screw (Werner 40) compounding conditions; T° = 250–280° C.; speed = 300 rpm; throughput = 80 kg/h

What is claimed is:

1. Thermoplastic compositions comprising:
   40 to 97 percent by weight of a thermoplastic polymer (M) forming a matrix, the thermoplastic polymer (M) being selected from the group consisting of fluoro polymers, polycarbonate, styrene resins, PMMA, thermoplastic polyurethanes (TPU), copolymers containing polyester blocks and polyether blocks, polycarbonate-polyester alloys, polyketones, PVC and ethylene-vinyl alcohol copolymers (EVOH),
   60 to 3 percent by weight of (B) comprising:
      either an ethylene-alkyl (meth)acrylate copolymer (B1), the alkyl having at least 8 carbon atoms, which copolymer (B1) further carries a functional group selected from the group consisting of carboxylic acids, carboxylic acid derivatives other than the ester functional group of the acrylate portion of the copolymer (B1), acid chlorides, isocyanates, oxazolines, epoxides, amines and hydroxides,
      or a blend of an ethylene-alkyl (meth)acrylate copolymer (B2), the alkyl having at least 8 carbon atoms, which copolymer (B2) does not carry a functional group selected from the group consisting of carboxylic acids, carboxylic acid derivatives other than the ester functional group of the acrylate portion of the copolymer (B2), acid chlorides, isocyanates, oxazolines, epoxides, amines and hydroxides, and of an impact modifier which carries a functional group selected from the group consisting of carboxylic acids and their derivatives, acid chlorides, isocyanates, oxazolines, epoxides, amines and hydroxides;
   wherein the percentages by weight of (M) and (B) are based on the total weight of each composition.

2. Compositions according to claim 1, wherein the alkyl of the alkyl(meth)acrylate of (B1) and (B2) has from 8 to 20 carbon atoms.

3. Compositions according to claim 2, wherein acrylate is 2-ethylhexyl acrylate.

4. Compositions according to claim 2, wherein the alkyl (meth)acrylate of (B1) and (B2) is 2-ethylhexyl acrylate.

5. Compositions according to claim 1 wherein the impact modifier is an ethylene/alkyl (meth)acrylate/maleic anhydride copolymer.

6. Compositions according to claim 1, wherein the compositions each comprise from 5 to 35 percent by weight of (B) and 95 to 65 percent by weight of (M), the percentages by weight of (B) and (M) being based on the total weight of each composition.

7. Compositions according to claim 6, wherein the compositions each comprise from 15 to 25 percent by weight of (B) and from 85 to 75 percent by weight of (M), the percentages by weight of (B) and (M) being based on the total weight of each composition.

8. Thermoplastic compositions comprising by weight:

75 to 85% of a thermoplastic polymer (M) forming a matrix, the thermoplastic polymer (M) being a polyamide or a polyamide block copolymer, and 25 to 15% of (B) comprising:
either an ethylene-2-ethylhexyl (meth)acrylate copolymer (B1) further carrying a functional group selected from the group consisting of (i) carboxylic acid derivatives other than the ester functional group of the acrylate portion of the copolymer (B1), the carboxylic acid derivatives being selected from the group consisting of anhydrides, amides and imides of carboxylic acids, (ii) acid chlorides, (iii) isocyanates, (iv) oxazolines, (v) epoxides, (vi) amines and (vii) hydroxides, or a blend of an ethylene-2-ethylhexyl (meth)acrylate copolymer (B2) which does not carry a functional group selected from the group consisting of (i) carboxylic acid derivatives other than the ester functional group of the acrylate portion of the copolymer (B2), the carboxylic acid derivatives being selected from the group consisting of anhydrides, amides and imides of carboxylic acids, (ii) acid chlorides, (iii) isocyanates, (iv) oxazolines, (v) epoxides, (vi) amines and (vii) hydroxides, and of an impact modifier which carries a functional group selected from the group consisting of (i) carboxylic acid derivatives other than the ester functional group of the acrylate portion of the copolymer (B2), the carboxylic acid derivatives being selected from the group consisting of anhydrides, amides and imides of carboxylic acids, (ii) acid chlorides, (iii) isocyanates; (iv) oxazolines, (v) epoxides, (vi) amines and (vii) hydroxides;

the percentages of (M) and (B) being based on the total weight of each composition.

9. Compositions according to claim 8, wherein the functional group carried by the ethylene-2-ethylhexyl (meth) acrylate copolymer (B1) is maleic anhydride.

* * * * *